J. L. BUTLER.
GAS AND AIR VALVE FOR OPEN HEARTH FURNACES.
APPLICATION FILED NOV. 17, 1908.
972,435.
Patented Oct. 11, 1910.
2 SHEETS—SHEET 1.
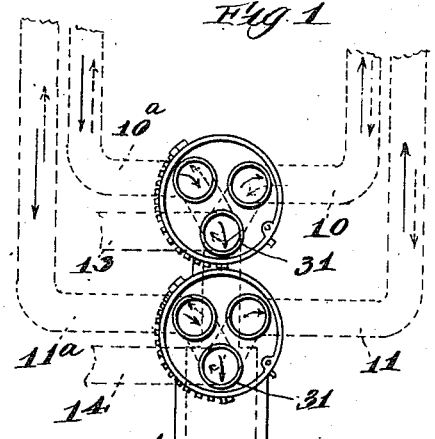
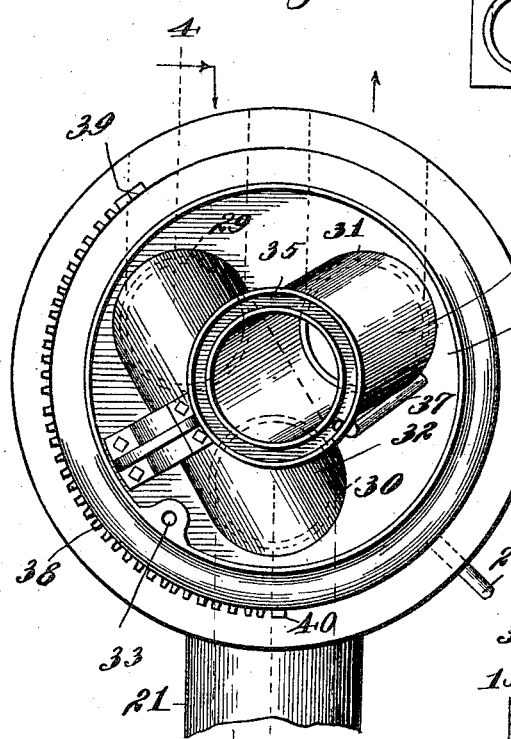
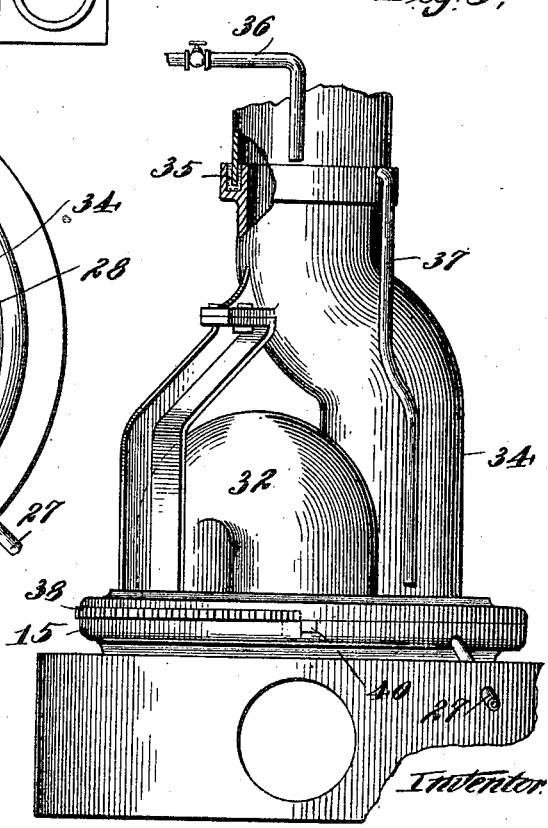
Witnesses:
Inventor
James L. Butler
By Offield, Towle & Linthicum
Attys J. L. BUTLER.
GAS AND AIR VALVE FOR OPEN HEARTH FURNACES.
APPLICATION FILED NOV. 17, 1908.
972,435.
Patented Oct. 11, 1910.
2 SHEETS—SHEET 2.
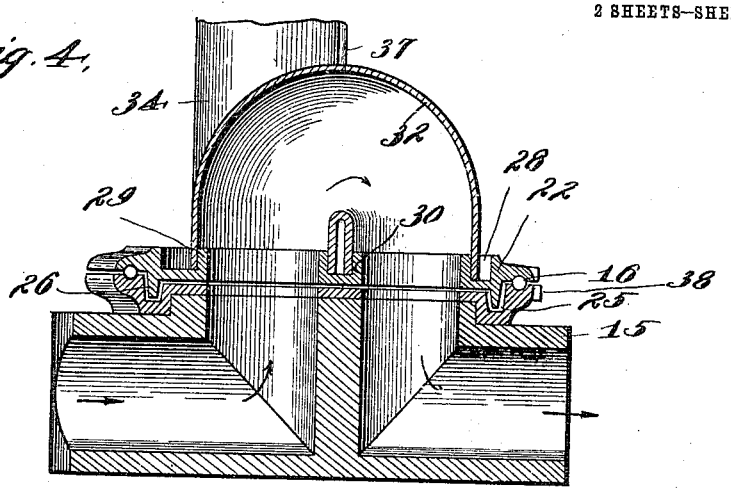
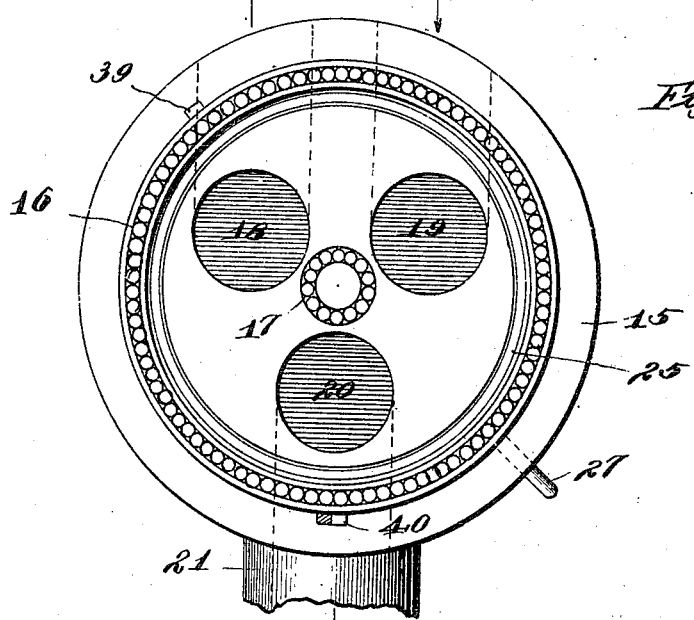
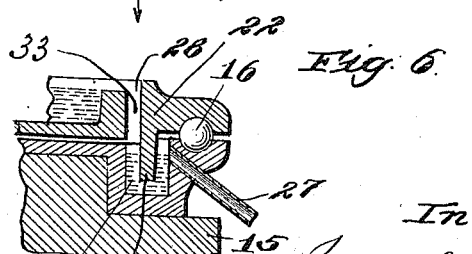

UNITED STATES PATENT OFFICE.

JAMES L. BUTLER, OF ALLIANCE, OHIO.

GAS AND AIR VALVE FOR OPEN-HEARTH FURNACES.

972,435.  Specification of Letters Patent.  Patented Oct. 11, 1910.

Application filed November 17, 1908. Serial No. 463,115.

*To all whom it may concern:*

Be it known that I, JAMES L. BUTLER, a citizen of the United States, residing at Alliance, in the county of Stark and State of Ohio, have invented certain new and useful Improvements in Gas and Air Valves for Open-Hearth Furnaces, of which the following is a specification.

My invention relates to furnaces of that type in which gas is used as a fuel and there is supplied a blast of air which commingles with the gas to promote and support combustion. In these furnaces, in order to preheat the gas and air before admission to the combustion chamber, the air and gas and the hot gases are alternately directed through the same pipes.

My invention relates more particularly to a valve arrangement whereby this reversal may be conveniently effected and the valve protected from the destructive action of the hot gases.

In the accompanying drawings, Figure 1 is a diagrammatic plan view showing the gas and air supply pipes, the valves therefor, and the stack and its connection to the gas and air valve chambers; Fig. 2 is a plan view of the valve mechanism with the supply pipe thereof omitted; Fig. 3 is a side elevation of the same, partly broken away; Fig. 4 is a section on the line 4—4 of Fig. 2; Fig. 5 is a plan view particularly intended to show the bearings for the rotating member of the valve; and Fig. 6 is a detail through the outer ball race, and showing a water seal chamber and the over-flow therefrom.

In the accompanying drawings, 10 10$^a$ represent air ducts or pipes communicating with the air valve and 11 11$^a$ ducts or pipes communicating with the gas valve. As these valves are of like construction only one of them need be particularly described. These valves are located intermediate the furnace stack 12 and the furnace, not shown. Air will be supplied to the air valve through a port or passage indicated at 13, and gas will be supplied to the gas valve through the pipe indicated at 14.

It will be understood that these air and gas passages are large, and that the valves are very heavy. Also that, when the direction of the flow is reversed, the valves are subjected to intense heat, and, therefore, it is necessary that they shall be thoroughly protected by a suitable cooling provision, usually a flowing body of water.

It is to the provision of a construction and means whereby the valves may be readily manipulated and properly protected from the heat that my invention chiefly relates.

The valve structure comprises a stationary base 15, in which are formed raceways 16 17 to receive the balls or anti-friction elements. Ports 18 19 and 20 are provided in this stationary member. The ports of the air valve communicate, respectively, with the pipes 10 10$^a$ and a duct 21 leading to the furnace stack 12; and the ports of the gas valve communicate with the pipes 11, 11$^a$ and the duct 21. Mounted upon the stationary base is a rotating plate 22 which is provided with raceways conforming to the ball raceways 16 17. The base plate has also an annular water seal chamber 25, and the rotatable member 22 has a depending annular flange 26 which enters said chamber. This chamber is provided, as shown in Fig. 6, with an overflow 27. The upper surface of the plate 22 terminates in a peripheral flange 28, and said plate is provided with three ports or passages which may be brought into register with the passages 18 19 20 by the adjustment of the plate 22. These ports or passages are surrounded by the upstanding flanges 29 30 31, and the flanges 29 30 receive the elbow or U-shaped pipe 32, thereby establishing communication between the ports 18 20. The annular flange 28 and the upstanding collars or flanges around the ports in the movable member afford a cooling chamber, which will be kept filled with a flowing liquid, and such chamber is provided with an overflow 33.

34 represents the supply pipe, which will be fitted into the flange or collar 31, and which will be in communication with the pipe 13 of the air valve or the pipe 14 of the gas valve. This supply pipe is provided at its upper end with a water seal, shown at 35, into which the supply pipe will seat, as shown in Fig. 3, it being understood that this supply pipe may be either the air-supply pipe 13 or the gas-supply pipe 14. Preferably, cool water will be continually supplied to this chamber 35, as, for example, through the supply pie 36, and overflowing therefrom through the pipe 37, the cooling liquid will pass into the pan or water chamber surrounding the bases of the pipes 32 34, and will overflow therefrom through the port 33 into the water seal chamber 25, and eventually will escape by the waste outlet 27.

For the purpose of the convenient manipulation of the rotatable member of the valve, it is provided on its perimeter with rack teeth 38, and in order to insure proper registration of the port openings, the members 15 and 22 will be provided with stops 39 40, as shown in Figs. 2 and 3.

Assuming now the typical arrangement shown in Fig. 1 of the drawing, and that air is being supplied to the air valve through the air pipe 13 and gas through the supply pipe 14, and that the various parts are in the positions indicated, the gas and air will pass through the pipes $10^a$ $11^a$ at the left of the figure, and mingling within the combustion chamber will be consumed, and the products of combustion will return through the pipes 10 and 11 to the air and gas valves, respectively, and will pass through the elbow pipe 32, through the duct 21, to the stack 12.

Now, when it is desired to reverse the flow, the valves will be shifted so as to direct the supply of air and gas through the pipes 10 and 11 and the return through the pipes $10^a$ and $11^a$. In this manner the air and gas on their passage to the furnace will be pre-heated by passing through the previously heated pipes, while the products of combustion will return through the previously cool pipes. This reversal of the flow may be made regular and automatic by any simple arrangement of gearing by which the movable member of the valve is operated, and, therefore, the reversal of the flow may take place at predetermined intervals of such frequency as to pre-heat the air and gas continually.

I am aware that it is not new to reverse the direction of flow of the currents in a device of this kind and that it is common to employ a bent or U-shaped pipe in connection with three ports or passages whereby two of them may be placed in communication, but so far as I am aware this shifting had to be accomplished by lifting the connecting pipe. It will be perceived that by permanently connecting two of the ports or passages by any suitable means and the third port or passage to a supply pipe and making the structure on which said pipes are mounted rotatable that the same may be brought into register with ports or passages in a stationary member so as to effect this reversal of current without a manual lifting of the connecting pipe. Further it will be seen that by my improved construction all of the ports may be thoroughly protected from heat, or water cooled, and that the shifting or reversal may be placed under automatic control, thus effecting a saving of time and a better protection to the various parts of the mechanism.

While I have shown and described in considerable detail the preferred embodiment of my invention, it is evident that the same might be modified as to its structural details without departing from the spirit of the invention, and I do not, therefore, limit myself to such structural details except as indicated in the claims.

I claim:

1. A base for reversing valves comprising a stationary member having ports, a circular race way surrounding the ports, and a circular channel surrounding the ports between the latter and the race-way, a rotatable plate mounted upon the stationary member and provided with ports to register with the ports of the stationary member, a race-way in the underside of the plate and corresponding with the race-way of the stationary member, a channel in the top of the plate surrounding the ports, and a depending annular flange dipping into the channel of the stationary member, there being an opening through the bottom of the channel communicating with the channel in the stationary member, anti-friction balls in the race-ways, and an overflow leading from the channel in the stationary member through the outer wall thereof and below the race-way, substantially as described.

2. A reversing valve comprising upper and lower relatively rotatable members having registrable ports, an annular anti-friction bearing between the members, an annular water seal between the members and located between the anti-friction bearing and the ports, and an overflow from the water seal extending through the lower valve member beneath the anti-friction bearing, substantially as described.

JAS. L. BUTLER.

Witnesses:
  A. J. TICE,
  S. E. FOUTS.